United States Patent [19]

Stolzer

[11] 4,046,041

[45] Sept. 6, 1977

[54] CLAMPING AND FEEDING DEVICE FOR COLD SAWS

[75] Inventor: Paul Stolzer, Achern, Germany

[73] Assignee: KEURO Maschinenbau Gesellschaft mit beschrankter Haftung & Co Kommanditgesellschaft, Achern, Germany

[21] Appl. No.: 717,396

[22] Filed: Aug. 24, 1976

[30] Foreign Application Priority Data

Sept. 19, 1975  Germany .............................. 2541781

[51] Int. Cl.² ...................... B23D 49/04; B23D 51/04; B23D 51/18
[52] U.S. Cl. ........................................ 83/210; 83/453; 83/212; 83/259; 83/262; 83/268; 83/282; 83/375; 83/759; 83/461
[58] Field of Search .................. 83/210, 212, 221, 222, 83/259, 261, 262, 268, 282, 375, 389, 390, 391, 759, 460, 461, 453

[56] References Cited

U.S. PATENT DOCUMENTS

| 3,570,349 | 3/1971 | Behrendt | 83/453 |
| 3,813,976 | 6/1974 | Greer | 83/210 |
| 3,884,106 | 5/1975 | Aizawa | 83/453 |

*Primary Examiner*—Donald R. Schran
*Attorney, Agent, or Firm*—Spencer & Kaye

[57] ABSTRACT

A device for feeding a workpiece to the saw component of a sawing machine and for clamping the workpiece during the cutting thereof by the saw component, has first and second clamping jaws supported on a table of the sawing machine and cooperating with one another for immobilizing the workpiece; and a feed roller supported at the machine table in the zone of the clamping jaws for feeding the workpiece into the operational range of the saw component. The device further has an arrangement connected to the first clamping jaw for displacing the same towards and away from the second clamping jaw in a direction inclined with respect to the surface of the machine table. In this manner the first clamping jaw can be set at a relatively short distance from the surface of the machine table into a closed position in which it presses the workpiece against the second clamping jaw and further, the first clamping jaw can be set at a relatively large distance from the surface of the machine table into an open position in which it releases the workpiece. The device further has an arrangement coupled to the feed roller for moving the same into an operative position simultaneously with the displacement of the first clamping jaw into its open position and for moving the feed roller into an inoperative position simultaneously with the displacement of the first clamping jaw into its closed position. In the operative position the feed roller projects, at least partially, beyond the surface of the machine table for engaging and advancing the workpiece and in the inoperative position the feed roller is in a withdrawn state below the surface of the machine table.

16 Claims, 5 Drawing Figures

CLAMPING AND FEEDING DEVICE FOR COLD SAWS

BACKGROUND OF THE INVENTION

This invention relates to a clamping and feeding device for workpieces which are to be cut with a cold saw (such as a bow saw, a cold circular saw or a band saw) and which are positioned on a machine table at least during the cutting operation. The device has facing, cooperating clamping jaws, at least one of which can be adjusted (and tightened) throughout the possible cross-sectional range of the workpieces. The device further has at least one power-driven feed roller which has a rotary axis oriented transversely to the direction of feed and which, in the zone of the clamping jaws, engages the workpiece for advancing the same into the operational range of the saw component of the sawing machine. The device is, in addition, provided with a stop for limiting the workpiece feed.

In a device of the above-outlined known type the pairwise arranged rollers simultaneously serve as the clamping jaws, that is, they replace the usual clamping jaw faces. The rollers constituting one of the clamping jaws are power driven. This mechanism is so arranged that the clamping jaws are not moved away from one another even during the feeding phase of the workpiece. Consequently, the workpiece feed on the machine table is effected under the full clamping pressure. This results in significant force losses and frictional losses. For the purpose of reducing the frictional losses between the workpiece and the machine tablet, it is feasible to arrange the roller way that supplies the workpieces in a slightly elevated manner. It is, however, the result of such an arrangement that the last workpiece, because of the absence of a rear counterweight, slides forwardly and downwardly during the sawing operation, so that oblique cut surface will result.

Further, in conventional planar clamping jaws and workpiece feed devices that have a second clamping jaw pair (which may be displaceable in the direction of feed), it is an inconvenient phenomenon that the workpiece, as the number of incremental feed steps increases, wanders upwardly between the clamping jaws which again results in oblique cuts.

SUMMARY OF THE INVENTION

Main objects of the invention are to provide an improved clamping and feeding device of the above-outlined type which makes it possible to effect the workpiece feed while the clamping jaws are open and wherein the tendency of upward wandering of the workpiece, present in planar clamping jaws, is counteracted with simple means which do not require additional space, and which operate automatically in an operationally safe manner in phase with the operation of the sawing machine without the need of skilled personnel.

These objects and others to become apparent as the specification progresses, are accomplished by the invention, according to which, briefly stated, the device for feeding a workpiece to the saw component of a sawing machine and for clamping the workpiece during the cutting thereof by the saw component, has first and second clamping jaws supported on a table of the sawing machine and cooperating with one another for immobilizing the workpiece; and a feed roller supported at the machine table in the zone of the clamping jaws for feeding the workpiece into the operational range of the saw component. The device further has an arrangement connected to the first clamping jaw for obliquely displacing the same towards and away from the second clamping jaw in a direction inclined with respect to the surface of the machine table. In this manner the first clamping jaw can be set at a relatively short distance from the surface of the machine table into a closed position in which it presses the workpiece against the second clamping jaw and further, the first clamping jaw can be set at a relatively large distance from the surface of the mechanism table into an open position in which it releases the workpiece. The device further has an arrangement coupled to the feed roller for moving the same into an operative position simultaneously with the displacement of the first clamping jaw into its open position and for moving the feed roller into an inoperative position simultaneously with the displacement of the first clamping jaw into its closed position. In the operative position the feed roller projects, at least partially, beyond the surface of the machine table for engaging and advancing the workpiece and in the inoperative position the feed roller is in a withdrawn state below the surface of the machine table.

The device designed according to the invention, as outlined above, provides, on the one hand, that the workpiece feed occurs while the clamping arrangement is open. Thus, during the periods of workpiece feed no clamping force is present that would obstruct the motion of the workpiece. On the other hand, the workpiece is, during feed, lifted off the machine table by the feed roller so that a frictional resistance between the surface of the machine table and the workpiece is eliminated as well. Further, the oblique motion of the one clamping jaw provides for each new clamping operation a "deep drawing" effect, which ensures that the workpiece, upon clamping, is always pressed firmly against the machine table.

Advantageously, the obliquely displaceable clamping jaw is supported and guided in a block fixedly attached to the machine frame. Further, the block has, in the direction of the oblique guiding arrangement, an upwardly open bore to form the cylinder of a cylinder-and-piston assembly which effects the opening and closing motion of the obliquely displaceable clamping jaw. Further, the piston of the cylinder-and-piston assembly is articulated to the clamping jaw by means of is piston rod and is expediently biased in the clamping direction of the clamping jaw by means of springs with a spring force that is sufficient for clamping the workpiece. The opening motion of the clamping device is effected by introducing a pressure medium to that side of the piston which is remote from the spring arrangement, so that this hydraulic force acts against and overcomes the force of the springs to thus effect the opening motion of the obliquely displaceable clamping jaw. Further, the opening motion of the obliquely displaceable clamping jaw may be limited by virtue of the uncovering of a discharge port in the cylinder by the piston, thus causing the hydraulic medium to be discharged from the cylinder into a reservoir. By virtue of these measures it is possible to set the clamping pressure for the closed clamping device simultaneously with the one-time setting of the other clamping jaw as a function of the cross section of the workpiece. The springs biased in the piston in the clamping direction will then be pre-tensioned to a greater or lesser extent. Further, the above-mentioned bore in the cylinder of the cylinder-and-piston assembly provides in a simple manner an automatic opening of the clamping device without the need of complex accessories such as valves and the like.

From the structural point of view it has been found advantageous to form the obliquely displaceable clamping jaw as a housing which surrounds the block at least at is vertical sides with a sufficient freedom for the clamping motion and the opening motion. The housing forms, with those sides of the block that are perpendicular to the direction of workpiece feed, the earlier-mentioned oblique guide which may a conventional dovetail guide or the like provided between the block and the housing.

According to a further advantageous feature of the invention, the obliquely displaceable clamping jaw forms, with extensions projecting into the machine frame, the rotary bearing support for the feed roller; the walls of the housing (forming the obliquely displaceable clamping jaw) which are parallel to the direction of feed, are extended into the machine frame. The feed roller is extended axially in the direction of the obliquely displaceable clamping jaw and is, with its axial extension, supported in the last-named clamping jaw so that it duplicates the opening and closing motions (which are oblique with respect to the machine table) of the clamping jaw and simultaneously emerges from the machine table to effect the workpiece feed. Upon completing the feed motion, the feed roller again disappears in the machine table. During the workpiece feeding operation, the feed roller lifts the workpiece off the machine table. According to an advantageous feature provided in this connection, the obliquely displaceable clamping jaw carries, on its side remote from the workpiece, a drive motor for the feed roller and that the drive motor is energizable at least for the duration of the opening period of the clamping device. The drive motor may simultaneously energize a pump for pressurizing the hydraulic medium of the cylinder-and-piston assembly. The motor can be energized by a limit switch actuated by the saw component upon termination of the sawing operation and its return from the cross-sectional zone of the workpiece. There is further provided a timing switch or another limit switch connected with the stop which limits the workpiece feed, for again de-energizing the drive motor.

By virtue of the above-outlined features, the clamping and feeding structured according to the invention constitutes a closed structural unit automatically provides for the opening of the clamping device, the lifting of the feed roller over the machine table, its drive and the repeated closing of the clamping device, including the lowering of the feed roller.

It is a further advantageous feature of the invention to provide that the stop for the limitation of the workpiece feed is, by virtue of the operation of the limit switch actuated upon termination of the sawing operation, movable for a short period of time from the work zone, together with the workpiece. This motion may be a pivotal motion or an axial motion in the feed direction; it has the purpose to insure that the severed workpiece falls unhindered, for example, into a collecting bin, prior to the beginning of the subsequent workpiece feed.

In case an axially movable stop is provided for limiting the workpiece feed, it is expedient to constitute the stop by the piston rod of a cylinder-and-piston assembly. The piston is spring-biased in the direction of the withdrawal of the stop from its operative position and that side of the piston which is remote from the spring can be exposed to the force of a hydraulic medium pressurized by the pump. By virtue of this arrangement the stop, during the entire sawing operation and also immediately thereafter, is in its withdrawn position, so that the severed workpiece may fall unhindered; the stop is thus in its operative position only during those periods when the pump is energized, that is, only during workpiece feed.

In the structure described up to this point, the force transmission between the feed roller and the workpiece during workpiece feed is effected by the own weight of the workpiece To enhance such a force transmission particularly in the case of light-weight (for example hollow) workpieces, it is advantageous to provide, opposite the feed roller (relative to the workpiece), a counter roller which is adjustably spring-biased towards the workpiece and which is supported parallel to the feed roller. The counter roller is adjustable in the direction of the workpiece and is coupled with the obliquely displaceable clamping jaw. The counter roller too, duplicates the motion of this clamping jaw and the feed roller.

Further, with regard to the adjustment of the other, stationary clamping jaw by a threaded spindle supported in the machine frame, it is of particular advantage to provide that the threaded spindle passes through a central axial bore of the feed roller and that this bore has a diameter so dimensioned that it permits the upward and downward motions of the feed roller with respect to the threaded spindle.

DESCRIPTION OF THE PREFERRED EMBODIMENT

Figure 1:
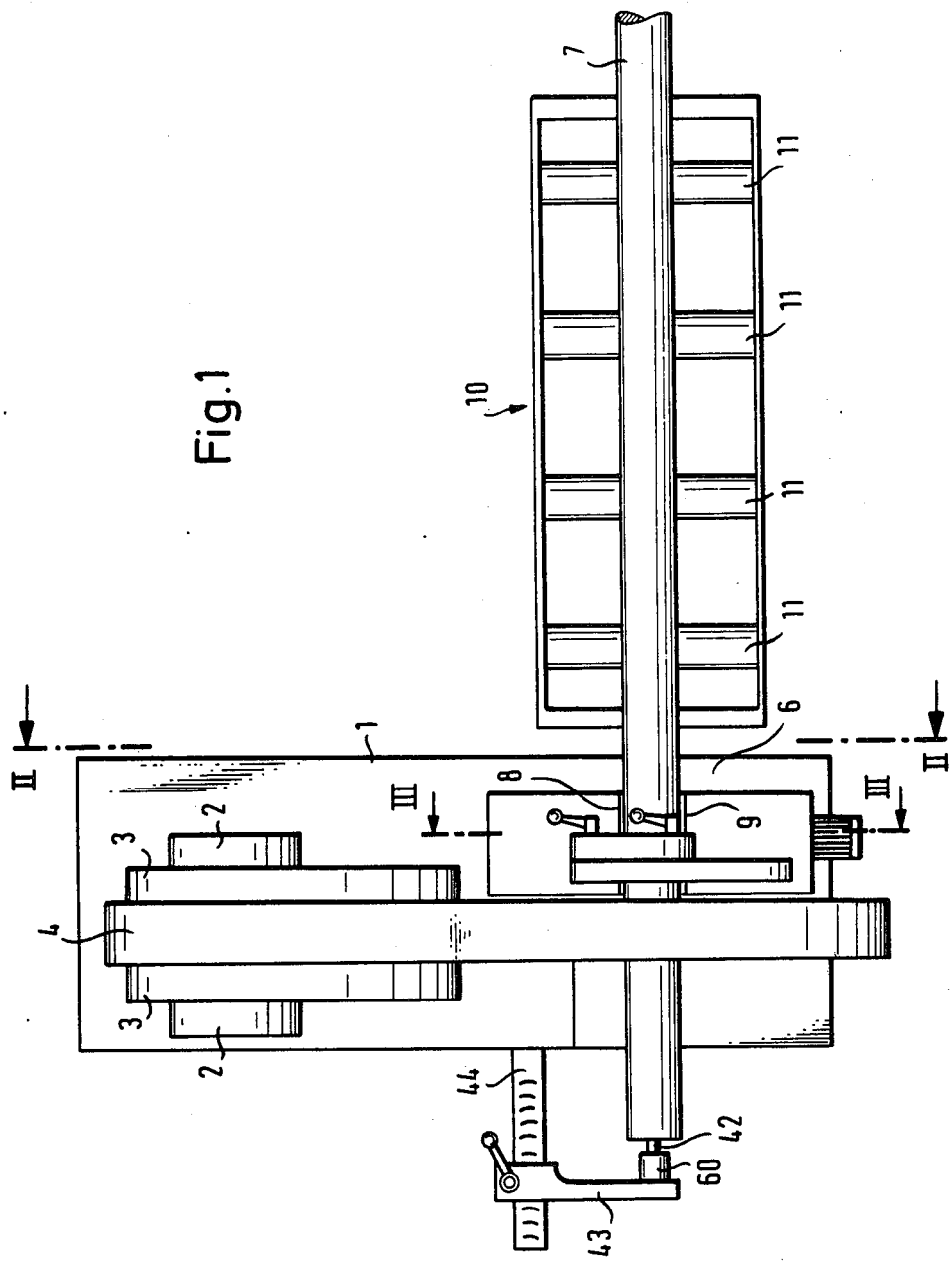
FIG. 1 is a schematic top plan view of a cold bow saw incorporating the invention.
Figure 2:
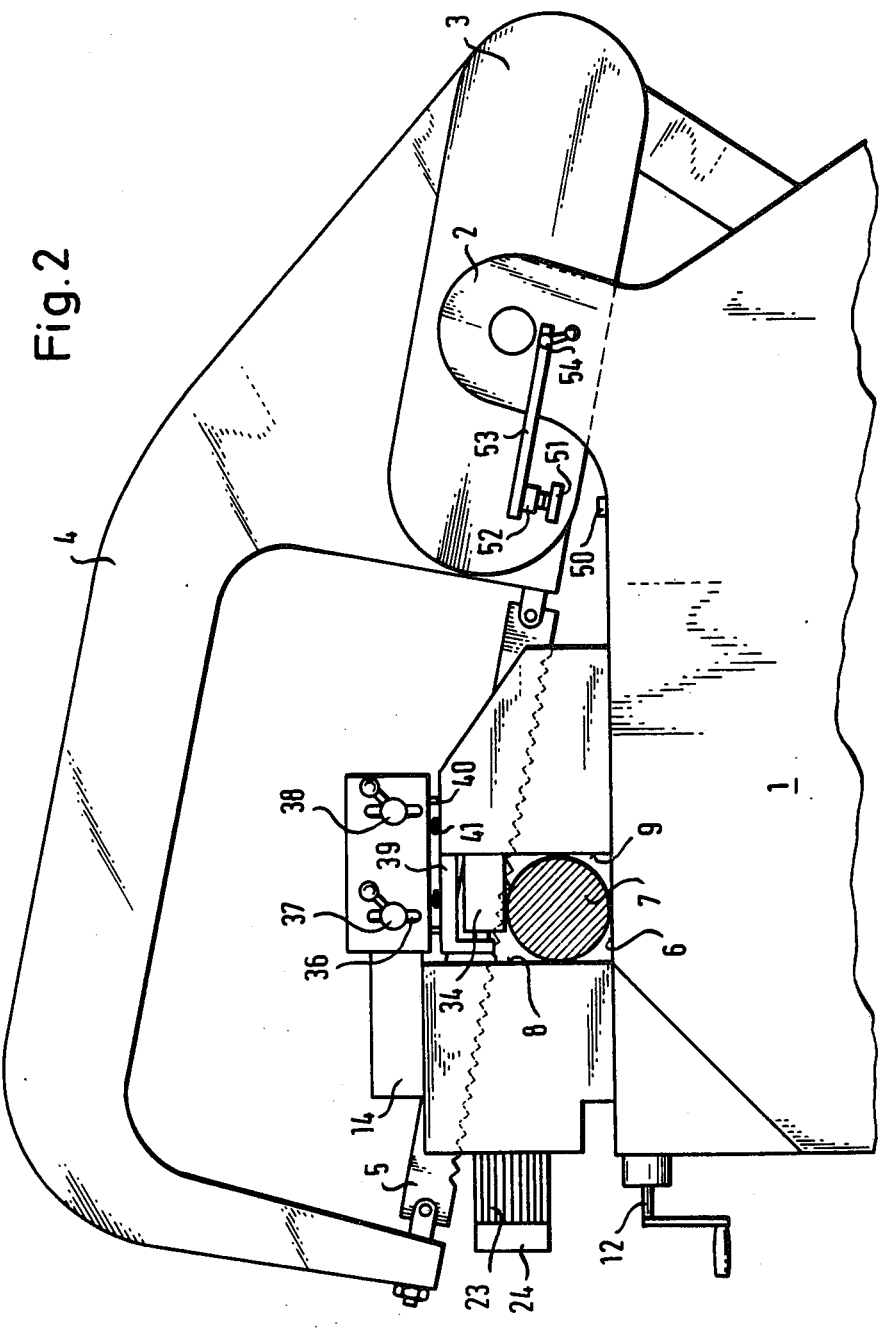
FIG. 2 is a partially sectional view taken along line II—II of FIG. 1.

Turning now to FIGS. 1 and 2, there is illustrated a bow saw machine having a machine stand 1 which includes side walls 2. Between the side walls 2 there is pivotally supported a guide housing 3 for a saw bow 4 carrying a saw blade 5.

The machine stand 1 forms a machine table 6 on which a workpiece 7, such as a bar, is held by cooperating clamping jaws 8 and 9 during the sawing operation. The workpiece 7 is supplied to the sawing machine on a roller way 10, the rollers 11 of which may be power-driven to effect the workpiece feed.

Turning in particular to FIG. 2, there is provided a limit switch 50 which, upon its actuation at the end of a sawing operation, effects, by energizing a power means, an upward (clockwise, as viewed in FIG. 2) pivotal motion of the saw bow guide housing 3 and thus an upward pivotal motion of the saw bow 4 for the purpose of preparing the successive sawing operation. The upward pivotal motion of the guide housing 3 is in progress until an abutment 51 (affixed to the housing 3) actuates a further limit switch 52. The latter is carried on an adjustable arm 53 and can be set (by turning a tightening screw 54) as a function of the cross-sectional dimensions of the workpiece to be handled.

Figure 3:
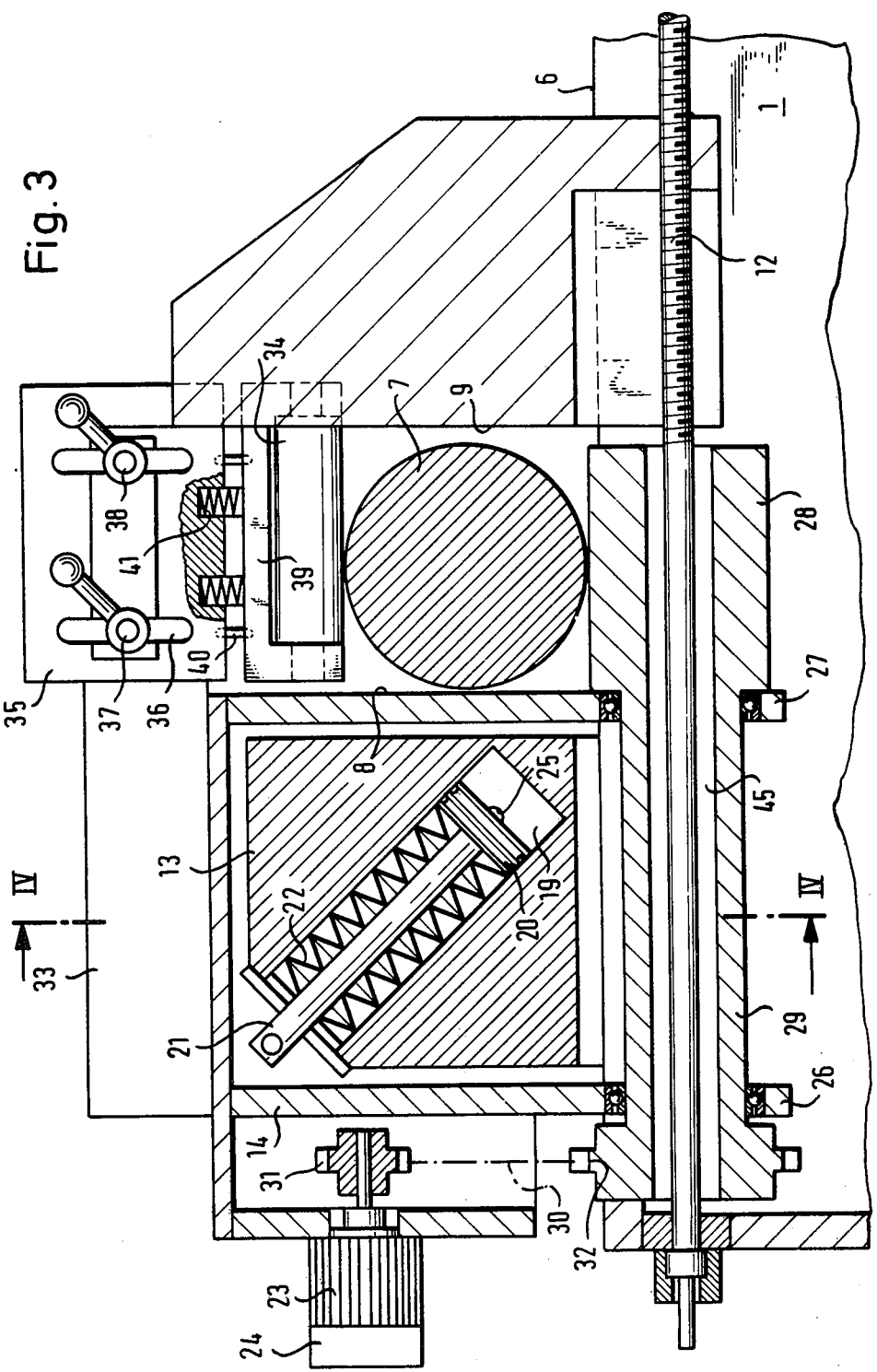
FIG. 3 is a fragmentary sectional view, on an enlarged scale, taken along line III—III of FIG. 1.
Figure 4:
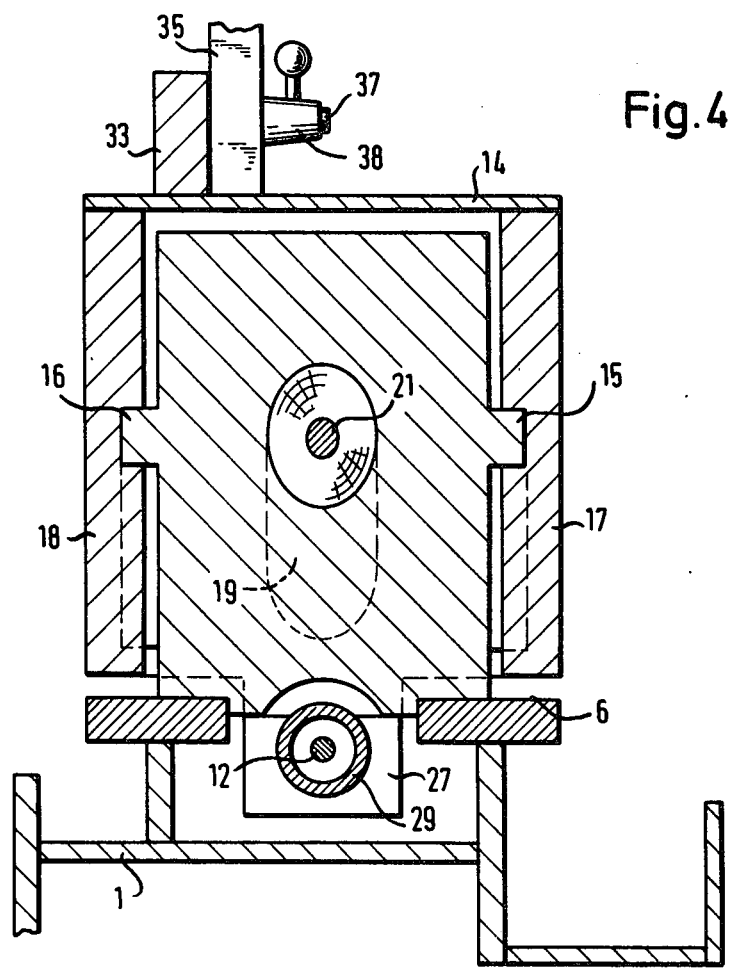
FIG. 4 is a sectional view taken along line IV—IV of FIG. 3.

Turning now to FIGS. 3 and 4, the clamping jaw 9 is, on the machine stand 1, adjustable as a function of the cross section of the workpiece 7 by means of a threaded spindle 12 supported on the machine stand.

The other clamping jaw 8 is, during the feed of the workpiece 7, movable away from the workpiece 7 and may be lifted off the machine table 6. To effect such an operation, there is provided a block 13 which is fixedly connected with the machine stand 1 and which is surrounded by the clamping jaw 8 formed as a housing 14. The clamping jaw 8 is supported on the block 13 and is obliquely displaceable thereon by guides 15 and 16 provided at opposite sides of the block 13 and cooperating with respective side walls 17 and 18 of the clamping jaw 8. The guides 15, 16 are inclined with respect to the surface of the machine table 6. Thus, as it will be described in greater detail later, the opening and closing motions of the clamping jaw 8 will occur, by virtue of the inclined guides 15, 16 in a direction that is inclined to the surface of the machine table 6.

The block 13 is provided with a bore 19 which extends parallel to the guides 15, 16 and which constitutes the cylinder of a cylinder-and-piston assembly. The latter has a piston 20 to which there is affixed a piston rod 21 which, in turn, is articulated to the housing 14 of the clamping jaw 8 and is loaded in the clamping direction (that is, in the direction of the workpiece 7 to be clamped) by means of a disc spring stack 22 arranged in the cylinder 19.

Figure 5:
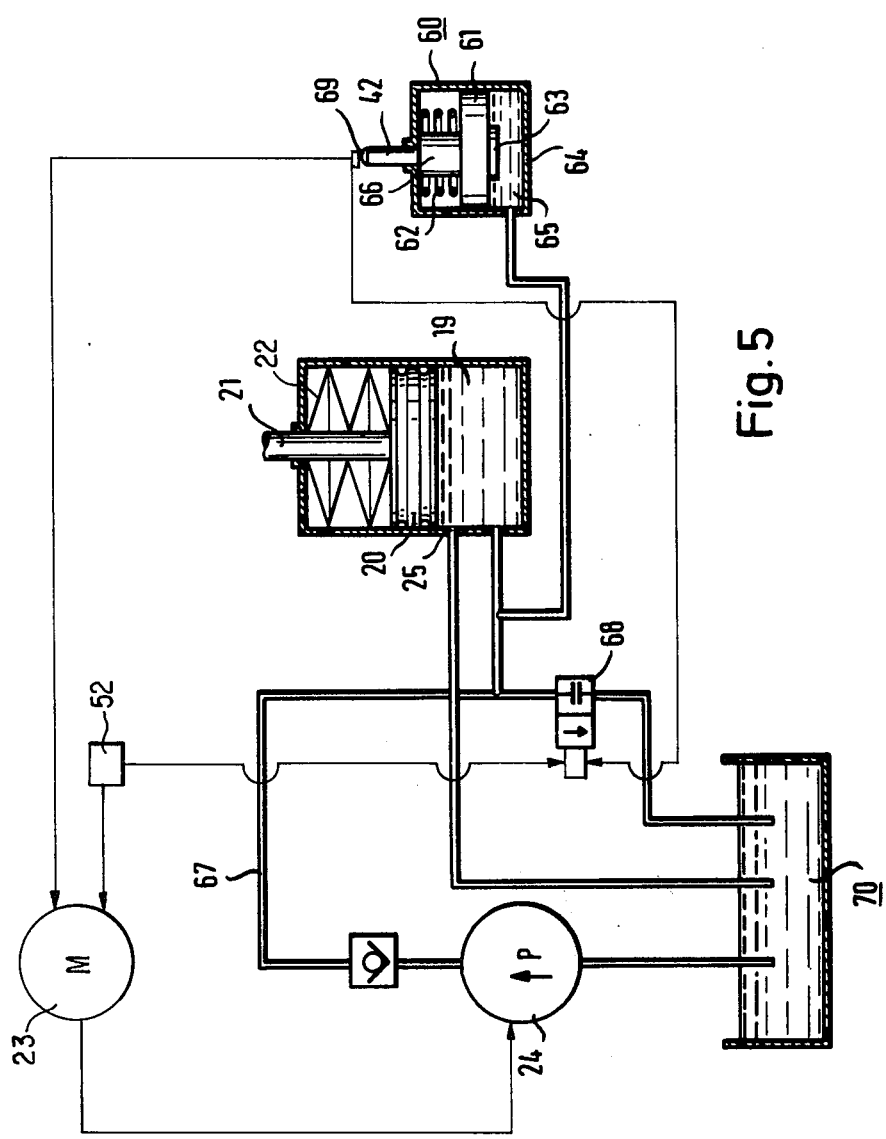
FIG. 5 is a schematic hydraulic circuit diagram incorporated in the cold bow saw of FIGS. 1-4.

The piston 20 is movable against the force of the disc spring stack 22 into the position shown in FIG. 3 by a pump 24 (FIG. 5) which is driven by a motor 23 carried by the housing 14. The pump 24 forces pressurized hydraulic fluid into that chamber of the cylinder 19 which is remote from the disc spring stack 2, until, in the course of its movement effected by the hydraulic pressure against the force of the spring 22, the piston 20 uncovers a port 25 (provided in the wall of the cylinder 19) through which the hydraulic medium is discharged into a depressurized reservoir 70 through a discharge conduit 71, as it is also shown in FIG. 5. In this manner the clamping jaw 8 is moved away from the clamping jaw 9 in an oblique, upward direction with respect to the machine table 6; thus the clamping device formed by the clamping jaws 8 and 9 is opened.

The housing 14 of the clamping jaw 8 has extensions 26 and 27 which project into the machine stand 1, below the upper face of the machine table 6. The extensions 26 and 27 have aligned openings through which passes an axial extension (shaft) 29 of a feed roller 28. In this manner, the feed roller 28 is rotatably supported by the clamping jaw housing 14. The feed roller 28 is driven by the motor 23 through a drive chain 30 which is trained about a pinion 31 of the motor 23 and a spur gear 32 at the terminus of the extension 29 of the feed roller 28.

The support of the feed roller 28 in the housing 14 of the clamping jaw 8 is so arranged that a work face portion of the feed roller 28, in the open position of the clamping jaw 8, projects above the machine table 6 as illustrated in FIG. 3. Conversely, in the closed position of the clamping jaw 8, the feed roller 28 is entirely withdrawn into the machine stand 1 below the level of the machine table 6.

The housing 14 of the clamping jaw 8 further carries, on an arm 33, a counter roller 34, cooperating with the feed roller 28. The counter roller 34 is adjustable in the direction of the workpiece 7. For this purpose the support 35 carrying the bearing frame 39 of the counter roller 34 has vertically-oriented longitudinal guides 36 through which pass guide bolts 37 of the arm 33. On the guide bolts there are arranged manually operable tightening screws 38. The bearing frame 39 is movable with respect to the support 34 and is guided by pins 40 in the direction of the workpiece 7 and is pressed thereagainst by means of springs 41 which urge the bearing frame 39 away from the support 35.

In the description which follows, the mode of operation of the above-described apparatus as will be set forth.

Upon completion of a cutting operation, the saw bow pivots upwardly and subsequently, for limiting this upward swing, the abutment 51 hits the on-switch 52, actuating the same. This switches on (energizes) the motor 23.

The result of this occurrence is that the pump 24, operatively coupled with the motor 23, drives pressurized hydraulic medium into that chamber of the cylinder 19 which is remote from the disc spring stack 22 (FIG. 5). As a result, the piston 20 is moved (obliquely upwardly) aginst the force of the spring stack 22, until the pressurized hydraulic medium is discharged through the port 25, thus preventing a further axial motion of the piston 20. The motion of the piston 20 prior to this depressurization of the cylinder chamber causes the clamping jaw 8 — by virtue of the connection between the piston 20 and the housing 14 — to be lifted obliquely upwardly with respect to the workpiece 7 and the machine table 6, and thus away from the clamping jaw 9. In this manner, on the one hand, the clamping force on the workpiece 7 is removed and, on the other hand, the feed roller 28 which revolves in the direction of feed when the motor 23 is in its energized state, is lifted so that a portion of its work face now projects beyond the upper surface of the machine table 6 and engages the workpiece 7.

The workpiece 7 is now advanced by the feed roller 28 until the workpiece abuts a stop 42 (see FIG. 1) which may contain a limit switch for deenergizing the motor 23 upon this occurrence. The deenergization of the motor 23 causes the clamping jaw 8 to move, under the effect of the disc spring stack 22, obliquely downwardly towards the workpiece 7, whereby, on the one hand, the latter is pressed against the clamping jaw 9 and the machine table 6 and, on the other hand, the feed roller 28 is lowered into the machine stand 1, thus becoming disengaged from the workpiece 7.

As it may be observed in FIGS. 3 and 4, the threaded spindle 12 which serves as an adjusting mechanism for the stationary clamping jaw 9, passes longitudinally through an axial throughgoing bore 45 of the feed roller 28 and its extension 29. The diameter of the spindle 12 and the bore 45 are so designed that the feed roller has sufficient radial play with respect to the stationary spindle 12 to execute its above-described shift with the housing 14.

In order to insure that the severed portion of the workpiece 7 falls at all times unhindered, for example, into a collecting container, not shown, the stop 42, as shown in detail in FIG. 5, may be constituted by a piston rod of a cylinder-and-piston assembly 60. The piston 61 of the assembly 60 is maintained normally, and particularly upon termination of the sawing operation, in a withdrawn position by a compression spring 62. In the withdrawn position a rearward stop 63 attached to the piston 61 is situated on the floor 64 of the assembly 60. Only when the pump 24 is energized, that is, during the workpiece feed, is the cylinder chamber 65 (which forms part of the cylinder-and-piston assembly 60 and which is remote from the spring 62) pressurized by the hydraulic fluid delivered by the pump 24. As a result, the piston 61 and thus the stop 42 are brought against the force of the compression spring 62 in the work position which is defined by a collar 66 and in which it constitutes the stop which limits the workpiece feed effected by the feed roller 28.

As further shown in FIG. 5, in a pressure conduit 67 of the pump 24 there is arranged a switch valve 68. As the pump is energized by the actuation of the limit switch 52, the switch valve 68 is set into its position shown in FIG. 5 in which it blocks communication between cylinder 19 and the fluid reservoir 70. When, on the other hand, the pump 24 is deenergized upon termination of the workpiece feed by means of actuating limit switch 69 positioned at the stop 42, the switch valve 68 assumes its other state in which the pressure conduit 67 is in hydraulic communication with the reservoir 70. In this manner the cylinder chambers 19 and 65 are rapidly depressurized which makes possible a rapid new clamping of the advanced workpiece between the clamping jaws 8 and 9.

It will be understood that the above description of the present invention is susceptible to various modifications, changes and adaptations, and the same are intended to be comprehended within the meaning and range of equivalents of the appended claims.

What is claimed is:

1. In a device for feeding a workpiece to the saw component of a sawing maching and for clamping the workpiece during the cutting thereof by the saw component; the sawing machine having a machine frame and a machine table; the device having first and second clamping jaws supported on the machine table and cooperating with one another for immobilizing the workpiece; a feed roller supported at the machine table in the zone of the clamping jaws for feeding the workpiece into the operational range of the saw component; and means for driving the feed roller; the improvement comprising
    a. first means connected to said first clamping jaw for displacing said first clamping jaw towards and away from said second clamping jaw in a direction inclined with respect to the surface of said machine table for setting said first clamping jaw to a relatively short distance from said surface of said machine table into a closed position in which it presses the workpiece against said second clamping jaw and for setting said first clamping jaw to a relatively large distance from said surface of said machine table into an open position in which it releases the workpiece; and
    b. second means coupled to said first means and to said feed roller for moving said feed roller into an operative position simultaneously with the displacement of said first clamping jaw, by said first means, into said open position and for moving said feed roller into an inoperative position simultaneously with the displacement of said first clamping jaw, by said first means, into said closed position; in said operative position said feed roller projecting, at least partially, beyond said surface of said machine table for engaging and advancing the workpiece and in said inoperative position said feed roller being withdrawn below said surface of said machine table.

2. A device as defined in claim 1, wherein said first means includes
    a. a stationary block affixed to said machine frame;
    b. guide means for obliquely displaceably guiding said first clamping jaw on said stationary block;
    c. means defining an upwardly open cylinder bore in said stationary block; said bore being oriented substantially parallel to said guide means;
    d. a piston received in said cylinder bore; said piston and said cylinder bore forming a cylinder-and-piston assembly;
    e. a piston rod affixed to said piston and articulated to said first clamping jaw; and
    f. energizing means for actuating said cylinder-and-piston assembly to effect opening and closing movements of said first clamping jaw.

3. A device as defined in claim 2, said energizing means comprising spring means urging said piston in the closing direction of said first clamping jaw with a force constituting a workpiece clamping force; and fluid pressure means for urging said piston against the force of said spring means in the opening direction of said first clamping jaw.

4. A device as defined in claim 3, including means defining a discharge port in said cylinder bore, said discharge port being controlled by a land of said piston for venting said cylinder bore to limit the displacement of said first clamping jaw in the opening direction.

5. A device as defined in claim 2, wherein said stationary block has a plurality of vertical sides; said first clamping jaw being constituted by a housing spacedly surrounding at least said vertical sides of said block; two of said vertical sides having a plane perpendicular to the direction of workpiece feed; said guide means having cooperating components in said housing and in said two vertical sides.

6. A device as defined in claim 1, wherein said second means includes bearing means affixed to said first clamping jaw and extending into said machine frame, said bearing means rotatably supporting and carrying said feed roller.

7. A device as claimed in claim 5, wherein two opposite sides of said housing have extensions projecting into said machine frame for rotatably supporting and carrying said feed roller, said extensions forming part of said second means.

8. A device as defined in claim 6, further comprising a drive motor carried by said first clamping jaw on a side oriented away from said feed roller; means connecting said drive motor with said feed roller; and means for energizing said feed roller at least during the period when said first clamping jaw is in its said open position.

9. A device as defined in claim 3, further comprising
    g. bearing means affixed to said first clamping jaw and extending into said machine frame; said bearing means rotatably supporting and carrying said feed roller; said bearing means forming part of said second means;
    h. a drive motor carried by said first clamping jaw on a side oriented away from said feed roller;
    i. means connecting said drive motor with said feed roller;
    j. a pump forming part of said fluid pressure means for pressurizing said cylinder bore, said pump being connected to said drive motor;

k. an on-switch connected to said motor and arranged in the path of motion of said saw component to be actuated thereby to operate said pump when said saw component moves away from the workpiece upon completion of a cutting operation and l. an off-switch connected to said motor to shut off said pump subsequent to its energization by the actuation of said on-switch.

10. A device as defined in claim 9, wherein said off-switch comprises a timing switch.

11. A device as defined in claim 9, further including a stop attached to the machine frame for limiting the workpiece feed, said off-switch comprises a limit switch carried by said stop and engageable by the workpiece.

12. A device as claimed in claim 2, further comprising
g. a stop positioned in the path of the workpiece feed for limiting the feed length of the workpiece;
h. withdrawing means for moving said stop out of the feed path of the workpiece; and
i. a switch connected to said withdrawing means and disposed in the path of motion of said saw component to be actuated thereby upon completion of a sawing operation for energizing said withdrawing means to move said stop out of the feed path of the workpiece.

13. A device as defined in claim 9, further comprising an additional cylinder-and-piston assembly including
a. a cylinder;
b. an additional piston slidably received in said cylinder;
c. a spring disposed in said cylinder for urging said additional piston in one direction;
d. means connecting said pump to said cylinder for generating a fluid pressure therein to overcome the force of said spring for moving said additional piston in another, opposite direction; and
e. an additional piston rod affixed to said additional piston and constituting a stop for limiting the feed length of the workpiece; said stop being in an operative position in the path of the workpiece feed in the pressurized state of the cylinder; said stop being moved into, and maintained in an inoperative position out of the path of the workpiece by said spring in the depressurized state of said cylinder.

14. A device as defined in claim 13, further comprising switch valve means for simultaneously venting the cylinder-and-piston assemblies upon de-energization of said pump.

15. A device as defined in claim 1, further comprising a counter roller urged by spring means against the workpiece in cooperation with said feed roller; means for supporting said counter roller on said first clamping jaw in an orientation parallel to said feed roller.

16. A device as defined in claim 1, further comprising an adjusting device for adjusting said second clamping jaw for setting a clamping distance between the first and second clamping jaws, said adjusting device including a threaded spindle rotatably supported in said machine frame and coupled to said second clamping jaw; said feed roller having a shaft provided with a throughgoing axial opening through which said threaded spindle passes; said axial opening having a sufficiently large diameter as to allow radial displacement of said shaft with respect to said threaded spindle upon operation of said second means.

* * * * *